(12) United States Patent
Balzer

(10) Patent No.: US 11,060,772 B2
(45) Date of Patent: Jul. 13, 2021

(54) HOSE ALIGNMENT SUBASSEMBLIES

(71) Applicant: Eaton Corporation, Cleveland, OH (US)

(72) Inventor: Derek D. Balzer, Burnsville, MN (US)

(73) Assignee: Eaton Intelligent Power Limited, Dublin (IE)

( * ) Notice: Subject to any disclaimer, the term of this patent is extended or adjusted under 35 U.S.C. 154(b) by 750 days.

(21) Appl. No.: 15/704,123

(22) Filed: Sep. 14, 2017

(65) Prior Publication Data

US 2018/0080691 A1 Mar. 22, 2018

Related U.S. Application Data

(60) Provisional application No. 62/395,508, filed on Sep. 16, 2016.

(51) Int. Cl.
| | |
|---|---|
| *F16L 39/00* | (2006.01) |
| *F25B 41/40* | (2021.01) |
| *B60H 1/00* | (2006.01) |
| *F16L 39/02* | (2006.01) |
| *F16L 41/08* | (2006.01) |
| *F25B 41/31* | (2021.01) |
| *F16L 3/04* | (2006.01) |

(Continued)

(52) U.S. Cl.
CPC ......... *F25B 41/40* (2021.01); *B60H 1/00521* (2013.01); *F16L 3/04* (2013.01); *F16L 25/00* (2013.01); *F16L 39/00* (2013.01); *F16L 39/02* (2013.01); *F16L 41/086* (2013.01); *F25B 41/31* (2021.01); *B60H 1/00571* (2013.01); *F16B 19/02* (2013.01)

(58) Field of Classification Search
CPC .. F25B 41/003; F25B 41/062; B60H 1/00521; B60H 1/00571; F16L 39/00; F16L 39/02; F16L 41/086; F16L 3/04; F16L 25/00; F16B 19/02
USPC ............ 285/190, 141.1, 142.1, 124.1, 124.2, 285/124.3, 124.4, 124.5, 205, 206
See application file for complete search history.

(56) References Cited

U.S. PATENT DOCUMENTS

| | | | | |
|---|---|---|---|---|
| 1,320,735 | A | * | 11/1919 | Chapman ................ F16L 39/00 285/124.3 |
| 1,860,969 | A | * | 5/1932 | True ....................... F22G 3/009 285/189 |

(Continued)

FOREIGN PATENT DOCUMENTS

| | | |
|---|---|---|
| DE | 10 2013 109 233 A1 | 3/2014 |
| EP | 2 322 368 A2 | 5/2011 |

(Continued)

OTHER PUBLICATIONS

Extended European Search Report for Application No. 17190730.6 dated Feb. 12, 2018.

*Primary Examiner* — Matthew Troutman
*Assistant Examiner* — James A Linford
(74) *Attorney, Agent, or Firm* — Merchant & Gould P.C.

(57) ABSTRACT

Subassemblies for air conditioners and other mechanical systems, and methods of assembling the same. In some embodiments, the subassemblies facilitate the proper installation, alignment, and servicing of hoses leading to and from thermal expansion valves in air conditioning and refrigeration systems. The subassemblies can be particularly helpful when installing thermal expansion valves in areas that are hard to reach or of limited space.

17 Claims, 12 Drawing Sheets

(51) Int. Cl.
*F16L 25/00* (2006.01)
*F16B 19/02* (2006.01)

(56) References Cited

U.S. PATENT DOCUMENTS

| | | | | |
|---|---|---|---|---|
| 2,510,125 A * | 6/1950 | Meakin | ............... | H01R 13/005 |
| | | | | 174/47 |
| 3,929,356 A * | 12/1975 | DeVincent | ......... | B60H 1/00571 |
| | | | | 285/305 |
| 5,354,101 A * | 10/1994 | Anderson, Jr. | ......... | F16L 39/00 |
| | | | | 285/25 |
| 5,491,983 A | 2/1996 | Hamilton et al. | | |
| 6,648,375 B1 * | 11/2003 | Panek | .................. | F16L 21/022 |
| | | | | 285/124.1 |
| 2009/0140515 A1 * | 6/2009 | Ichimura | ................ | F16L 39/00 |
| | | | | 285/124.5 |
| 2014/0265307 A1 | 9/2014 | Dorland et al. | | |

FOREIGN PATENT DOCUMENTS

EP  2 365 260 A2  9/2011
JP  11082846 A *  3/1999  ............ F16L 41/086

\* cited by examiner

HOSE ALIGNMENT SUBASSEMBLIES

BACKGROUND

Fluid carrying hoses are commonly used in numerous types of mechanical systems. In air conditioning and refrigeration systems, thermal expansion valves (TXV's) are used to control the flow of refrigerant into the evaporator. Typically, the refrigerant flows into the TXV via a high pressure input hose and exits the TXV via a low pressure output hose. In certain applications, such as air conditioning systems for automobiles and agricultural vehicles, in which physical space and/or installation access is limited, it is desirable to assemble and service (e.g., repair, remove, or replace) the input and/or output hoses to/from the TXV as simply and as quickly as possible. This type of assembly or servicing can be facilitated by configuring the TXV such that both the input and output hoses attach thereto on one and the same side of the TXV. Nevertheless, this type of assembly/servicing can still be cumbersome and difficult or impossible to coordinate by a single technician in small, hard to access TXV locations.

SUMMARY

One aspect of the present disclosure relates to an air conditioner or refrigerator subassembly comprising a first hose fitting, a second hose fitting, a bracket, and a fastener, each of the first and second hose fittings comprising a cutout having a border, at least two points on the border defining a radius of curvature, the first and second hose fittings being coupled to the bracket such that the first and second cutouts define a recess for receiving the fastener, the recess having a central axis aligned with a longitudinal dimension of the fastener, the central axis being coaxial with a center of the radius of curvature of each of the cutouts.

In some examples, each of the cutouts includes a shoulder, and the fastener includes a head and a stem, the head being configured to abut the shoulder of each of the cutouts.

In some examples, the fastener includes a longitudinal bore, the bore having opposing open ends and being configured to receive a shaft for fastening the subassembly to a TXV.

In some examples, the bracket has a first end and a second end opposite the first end, the bracket having a width that tapers between the first end and the second end.

In some examples, the bracket comprises first and second pilot openings configured to receive pilots of the first and second hose fittings and a fastener opening disposed between the first and second pilot openings and configured to receive the fastener.

Another aspect of the present disclosure relates to a method for assembling an air conditioner or refrigerator subassembly comprising the steps of: inserting a first pilot of a first hose fitting into a first opening of a bracket, the first hose fitting comprising a first cutout; inserting a second pilot of a second hose fitting into a second opening in the bracket, the second hose fitting comprising a second cutout; rotationally positioning the first hose fitting and the second hose fitting relative to each other such that the first cutout and the second cutout align with each other to form a recess; and inserting a fastener into the recess and into a hole in the bracket to rotationally constrain the first hose fitting and the second hose fitting.

In the detailed description that follows, subassembly embodiments are described with specific application to air conditioner and refrigeration systems. However, it should be appreciated that aspects and principles of the subassemblies of the present disclosure can be readily applied in other mechanical systems as well.

DETAILED DESCRIPTION

Figure 1:
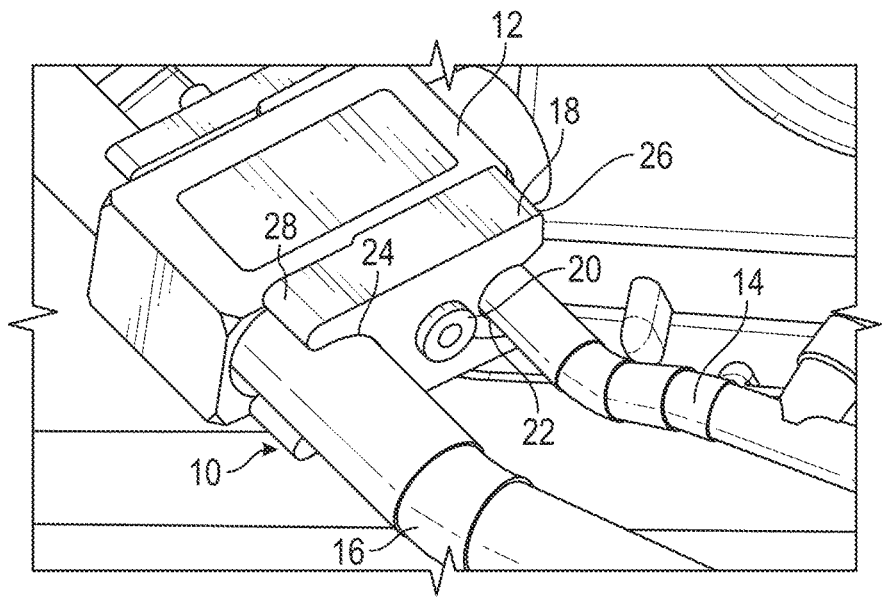
FIG. 1 is an isometric view of a prior art air conditioner subassembly mounted to a TXV unit.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a perspective view of a prior art air conditioner subassembly 10 mounted to a TXV unit 12. The subassembly 10 includes a high pressure hose 14, a low pressure hose 16, a bracket 18 and a bolt 20. Cutouts (22, 24) in the bracket 18 oppose each other, the cutouts (22, 24) having open ends on opposing sides (26, 28), respectively, of the bracket 18. The high pressure hose 14 passes through the cutout 22 and the low pressure hose 16 passes through the cutout 24 such that the bracket 18 laterally constrains the high pressure hose 14 and the low pressure hose 16. The bolt 20 secures the bracket 18 to the TXV unit 12.

The subassembly 10 suffers from a number of drawbacks. For example, during assembly, nothing restricts translational or rotational movement of the hoses (14, 16) relative to the bracket 18. Thus, it can be difficult for a single technician, particularly in a small space, to maneuver the hoses (14, 16) into the proper orientation while at the same time passing the hoses through the bracket 18 before securing the subassembly 10 to the TXV unit 12. In addition, once assembled each hose (14, 16) is constrained by separate cutouts (22, 24) of different size, the cutouts being sized, respectively, for the different sized hoses, the high pressure hose being of a smaller diameter than the low pressure hose. This can result in uneven clamp load of the hoses in the subassembly 10. In addition, the bracket 18 must be large enough to accommodate both hose cutouts as well as a central hole between the cutouts for receiving the bolt 20, the size of the bracket 18 making it difficult to use the subassembly 10 in small spaces.

Figure 2:
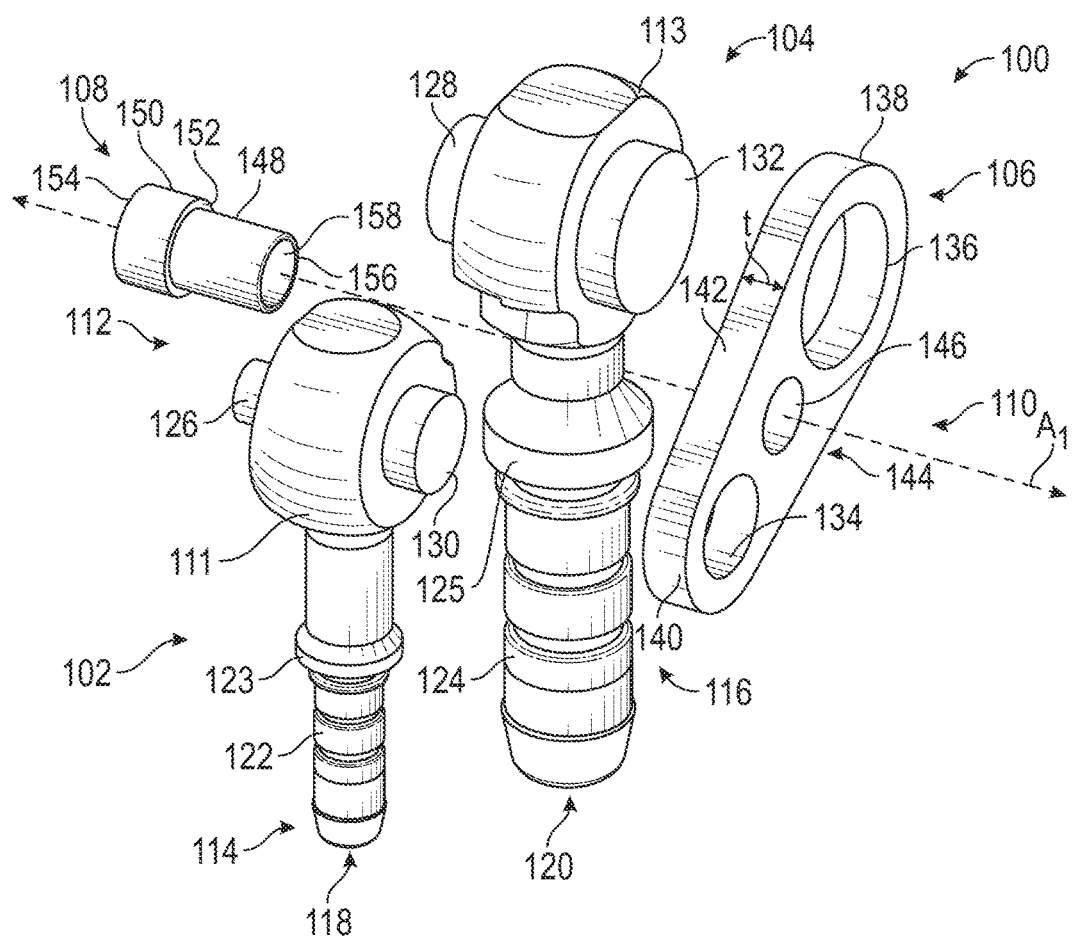
FIG. 2 is an exploded isometric view of an example air conditioner subassembly in accordance with the present disclosure.

FIG. 2 is an exploded isometric view of an example air conditioner subassembly 100 in accordance with the present disclosure. The subassembly 100 includes a high pressure hose fitting 102, a low pressure hose fitting 104, a bracket 106, and a fastener 108. The subassembly includes a front 110 and a back 112. When the subassembly 100 is installed in an air conditioning system, the back 112 generally faces towards a TXV unit to which the subassembly 100 is mounted, and the front 110 generally faces away from the TXV unit.

In this example, the high pressure hose fitting 102 and the low pressure hose fitting 104 have similar components, the components of the high pressure hose fitting 102 being smaller than the corresponding components of the low pressure hose fitting 104. Referring to the two fittings (102, 104), the fittings each include a body (111, 113) a hollow hose mounting portion (114, 116) extending from the body (111, 113) and having an open end (118, 120), the hose mounting portions being adapted to sealingly receive a hose that is sleeved over the outer wall (122, 124) of the mounting portions (114, 116), and flanges (123, 125) limiting how much the hoses can be sleeved onto the mounting portions (114, 116). Once assembled with hoses and a TXV unit, the hollow interior of the hose mounting portions (114, 116) is thus in fluid communication with the hose and also with the TXV unit via the tubular projections (126, 128) extending from the back of the body (111, 113) of the fittings (102, 104), the tubular projections (126, 128) of the fittings (102, 104) being inserted into corresponding openings in the TXV unit.

Pilots (130, 132) projecting forwardly from the front of the body (111, 113) of the fittings (102, 104) removably mate with corresponding openings (134, 136) in the bracket 106 via a clearance fit. The amount of clearance is selected to accommodate cumulative dimensional tolerances between features of the TXV unit and the subassembly 100. The amount of clearance can also be selected to limit the amount of angular deflection of the tubular projections (126, 128) relative to the axis $A_1$.

The bracket 106 has a first end 138 corresponding to an area of the bracket 106 that receives the pilot 130 of the smaller high pressure hose fitting 102, and a second end 140 opposite the first end 138 corresponding to an area of the bracket 106 that receives the pilot 132 of the larger low pressure hose fitting 104. A width of the bracket 106, defined as the distance between a top side 142 and a bottom side 144 of the bracket 106 narrows, i.e., tapers, towards the second end 140. This can reduce the weight of the subassembly 100 and the amount of space occupied by the subassembly 100.

A hole 146 through the entire thickness t of the bracket 106 receives the stem 148 of the fastener 108 via an interference fit.

The fastener can be any suitable fastening means which, when installed in the subassembly 100, constrains translational and/or rotational movement of both hose fittings (102, 104). Non-limiting examples of the fastener include a pin (e.g., a flared pin, a swaged pin) or a bolt (e.g., a threaded bolt) that can be pushed, screwed, or otherwise installed to complete the subassembly 100. In the example shown in FIG. 2, the fastener 108 is a pushable pin having the stem 148 and a head 150, the head having a forward facing annular flange 152. A hollow interior bore 158 through the fastener 108 extends between the fastener's open front end 156 and open back end 154. The interior bore 158 is configured to receive a bolt or other fastener inserted first through a TXV unit and then forwardly trough the fastener 108 from the back end 154 to the front end 156. Alternatively, the bolt or fastener 108 may be inserted rearwardly, first into the front of the subassembly 100 and then into the front of the TXV unit. The fastener 108 has a longitudinal axis $A_1$ along the center of the interior bore 158, the longitudinal axis $A_1$ passing through the center of the hole 146 when the subassembly 100 is assembled.

In the example shown, both the head 150 and the stem 148 of the fastener 108 have a cylindrical exterior shape, the cylindrical nature of the stem corresponding to the round shape of the hole 146. It should be appreciated, however, that alternative polygonal shapes (such as a square, pentagon, hexagon, octagon, etc.) can be used for the either or both of the head 150 and the stem 148, provided that the exterior shape of the stem 148 and the shape of the hole 146 allow for a clearance fit therebetween, and provided that the exterior shape of the head 150 corresponds with the shape of the cutouts of the fittings (102, 104), as described below. Modifications to the shapes of other mating components can also be suitable. For example, the round shapes of the pilots (130, 132) and the corresponding openings (134, 136) can be modified and still provide for the desired clearance fit therebetween.

Figure 3:
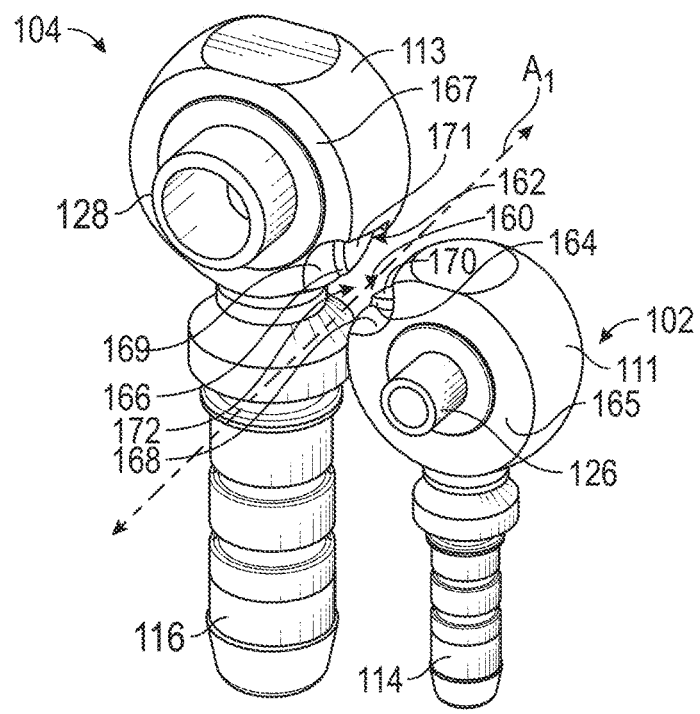
FIG. 3 is a back isometric view of the high pressure hose fitting and the low pressure hose fitting of FIG. 2.
Figure 5:
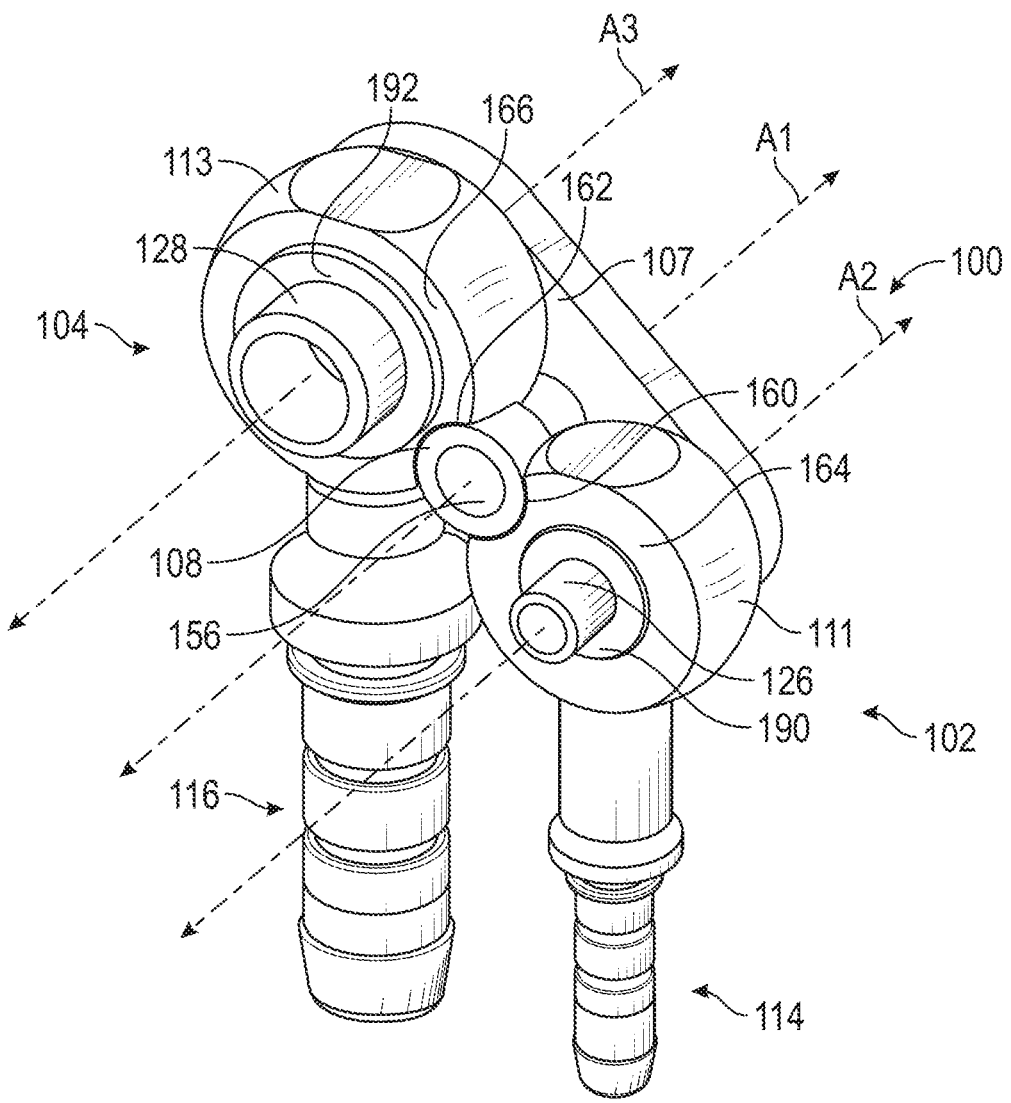
FIG. 5 is a back isometric view of the subassembly 100 of FIG. 2 shown in an assembled configuration.

FIG. 3 is a back isometric view of the high pressure hose fitting 102 and the low pressure hose fitting 104 of FIG. 2. The relative positioning of the hose fittings 102 and 104 in FIG. 3 is consistent with their relative positioning in a properly assembled subassembly 100 (FIG. 5). The hose fittings (102, 104) include the body (111, 113), the hose mounting portions (114, 116), and the tubular projections (126, 128) as described above. As shown in FIG. 3, each of the fittings (102, 104) includes a cutout (160, 162). The cutouts include a shoulder (164, 166), the shoulder being recessed from the back side (165, 167) of the body (111, 113). In this example, the border of the cutouts (160, 162), is curved, the curved border of one of the cutouts having a radius of curvature identical to the radius of curvature of the border of the other cutout. This applies to the back portion (168, 169) of the cutouts (160, 162), which is rearward of the shoulder (164, 166), as well as the front portion (170, 171) of the cutouts, the back border of which is defined by the shoulder (164, 166). That is, with respect to each of the back portion (168, 169) and the front portion (170, 171) of the cutouts (160, 162), the curved border of each of the portions of the cutouts has a radius of curvature that is identical to the radius of curvature of the border of the corresponding portion of the other cutout.

When the fittings (102, 104) are properly mounted in the subassembly 100 of FIG. 2 they are in the position relative to each other illustrated in FIG. 3, in which the cutouts (160, 162) define a recess 172 therebetween, and the longitudinal axis $A_1$ of the fastener 108 (FIG. 5) passes through the center of the recess 172, the axis $A_1$ passing through the center point of the radii of curvature of the curved borders of both front and back portions of the both cutouts (160, 162). That is, when the fittings (102, 104) are properly mounted in the subassembly 100 of FIG. 5, the cutouts (160, 162), are coaxially aligned with each other, the pin 108, and the hole 146 in the bracket 106.

In alternative examples, the cutouts in the fittings need not have curved borders. For example, each of the cutouts can have borders corresponding to some of the sides of a polygon, such as three sides of an octagon. Either or both of the back portion and the front portion of the cutouts can have such a modified border. However, in each modified version of the border of the cutouts, when the fittings are properly mounted in the subassembly each border defines a radius of curvature (e.g., the radius of curvature of an arc of a circle circumscribed about the border) having a center through which the longitudinal axis of the fastener passes such that the cutouts are coaxially aligned with each other, the fastener, and the hole in the bracket with which the fastener mates.

Figure 4:
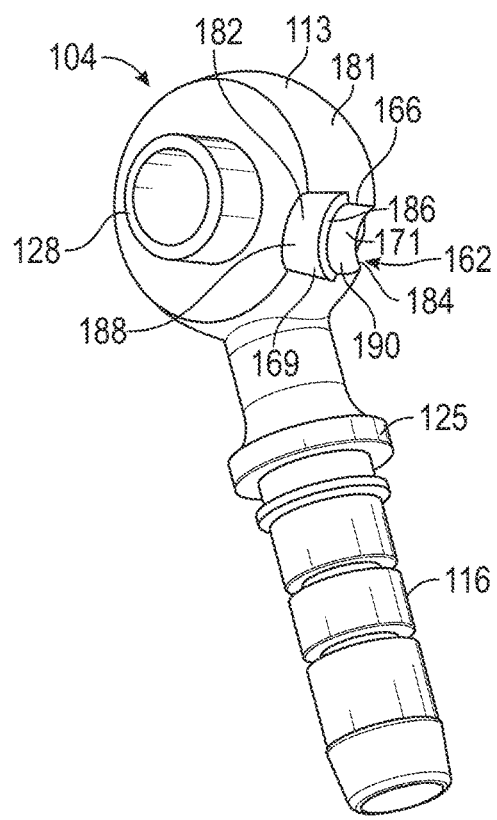
FIG. 4 is a back, isometric view of the low pressure hose fitting of FIG. 2.

FIG. 4 is a back, isometric view of the low pressure hose fitting 104 of FIG. 2. However, it should be appreciated that the fitting 104 shown in FIG. 4 is simply a larger, mirror image of the high pressure hose fitting 102 of FIG. 2. Thus, the discussion that follows with respect to FIG. 4 is equally applicable to the high pressure hose fitting 102.

Referring to FIG. 4, the fitting 104 includes the head 113, the hose mounting portion 116, the flange 125, the tubular projection 128, and the cutout 162. The cutout 162 is concave relative to the side surface 181 of the body 113. The cutout 162 includes the curved shoulder 166 defining the back portion 169 and the front portion 171 of the cutout as described above. As shown in FIG. 4, in this example the back portion 169 is defined by a curved border 182 and the front portion 170 is also defined by a curved border 184, the curvature of each of the borders (182, 184) being concave relative to the side surface 181 of the body 113.

When the subassembly 100 of FIG. 5 is properly assembled the forward facing annular flange 152 (FIG. 2) of the fastener 108 abuts the rearward facing surface 186 of the shoulder 166, the head 150 (FIG. 2) of the fastener 108 abuts the wall 188 of the back portion 168 of the cutout 162, and the stem 148 (FIG. 2) abuts the wall 190 of the front portion 170 of the cutout 170.

Figure 6:
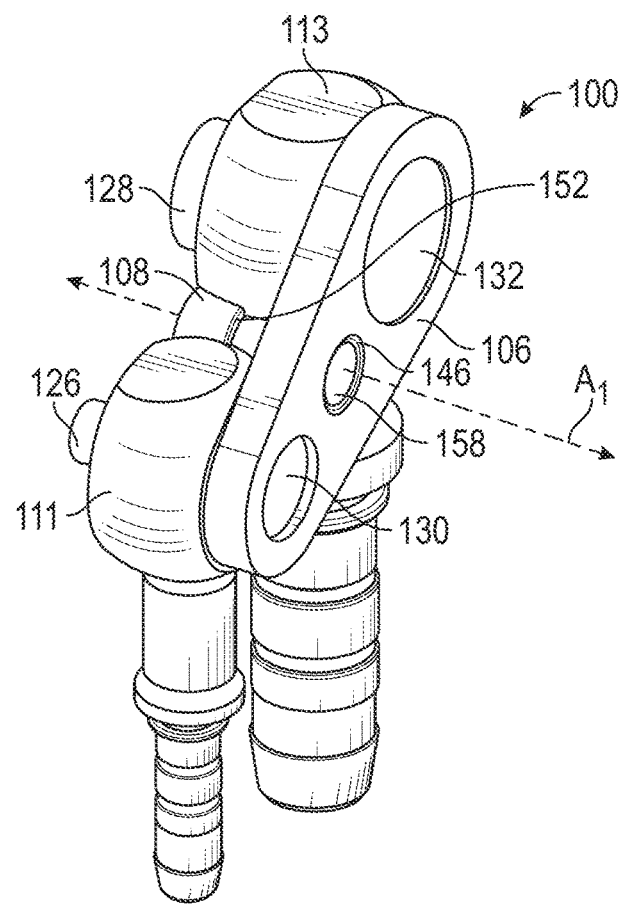
FIG. 6 is a front isometric view of the subassembly 100 of FIG. 2 shown in an assembled configuration.

FIG. 5 is a back isometric view of the subassembly 100 of FIG. 2 shown in an assembled configuration. FIG. 6 is a front isometric view of the subassembly 100 of FIG. 2 shown in an assembled configuration. Referring to FIGS. 5-6, the pilots (130, 132) have been inserted in the openings (134, 136) of the bracket 106 with the fittings (102, 104) positioned relative to each other such that the cutouts (160, 162) define the recess 172 described above. In addition, the pin 108 has been inserted into the recess 172 defined by the cutouts (160, 162) and into the hole 146 of the bracket 106, such that the forward facing annular flange 152 abuts the rearward facing surface of the shoulders (164, 166). The subassembly 100 can be configured such that full insertion of the fastener 108 requires a predetermined amount of force on the pin. In one example, approximately 1,500 pounds of force is required to install the fastener 108.

Once installed, the fastener 108 constrains rotation of the fittings (102, 104) about central axes ($A_2$, $A_3$) of the fittings (102, 104) that pass through the center of the tubular projections (126, 128) and are parallel to the axis $A_1$, while the clearance fit between the pilots (130, 132) and the openings (134, 136) in the bracket 106 constrains translational movement of the fittings (102, 104) relative to the back face 107 of the bracket 106. In addition, the engagement between the shoulder of the cutouts and the head of the fastener constrains axial translation of the fittings (102, 104) along the axes ($A_2$, $A_3$). Thus, once the subassembly 100 is assembled, the proper absolute and relative orientations of hoses and the hose fittings (102, 104) are properly fixed, greatly facilitating installation of the subassembly in the air conditioning system, even in tight spaces.

It should be appreciated, as indicated above, that components of the subassembly 100 can be manufactured with predetermined clearances to accommodate dimensional tolerances in the TXV unit. Thus, even after the subassembly is fully assembled, in some examples, small rotational and translational adjustments can be made to the fittings (102, 104) to ensure a proper mounting of the subassembly 100 to the TXV unit. It should also be appreciated that, prior to installing the fastener 108, rotational positioning of the fittings (102, 104) about the axes ($A_2$, $A_3$) can be adjusted so that the cutouts (160, 162) of the fittings are properly aligned to receive the fastener.

The subassembly 100 can be mounted to a TXV unit by inserting the tubular projections (126, 128) in corresponding holes in the TXV unit. Optionally, gaskets or pilots (190, 192) can be used to improve the fit between the subassembly 100 and the TXV unit.

When servicing or replacing the subassembly 100, the subassembly is dismounted from the TXV unit, the pin 108 is removed from the bracket 106 and either or both of the fittings (102, 104) can be removed for repair or replacement.

Figure 7:
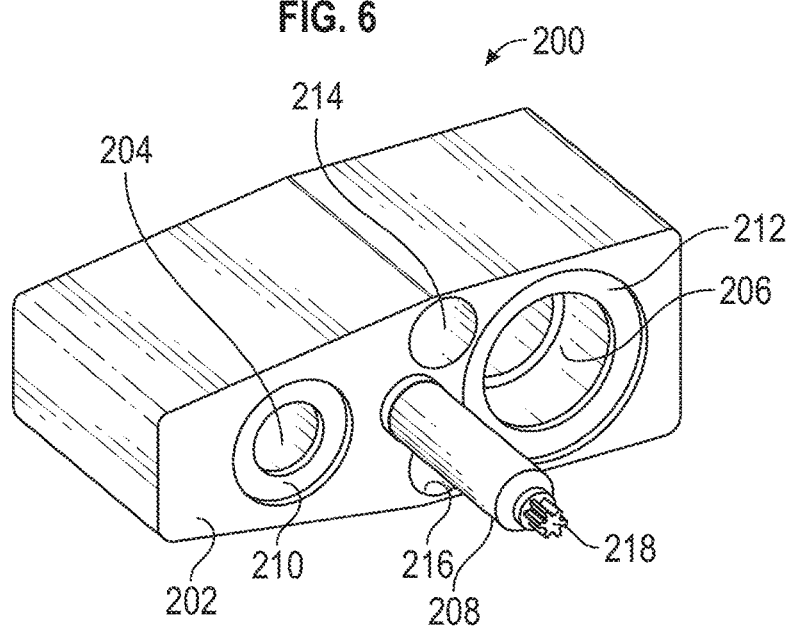
FIG. 7 is a front isometric view of an example TXV unit that can be used with the air conditioner subassembly of FIGS. 5-6.

FIG. 7 is a front isometric view of an example TXV unit 200 that can be used with the subassembly 100 of FIGS. 5-6. The TXV unit 200 includes a front face 202 a high pressure fitting mounting hole 204, a low pressure fitting mounting hole 206, and a shaft 208. Annular depressions 210 and 212 in the front face 202 surround the mounting holes 204 and 206, respectively. Auxiliary mounting holes 214 and 216 can support fasteners to, e.g., secure the TXV unit to the vehicle or other piece of machinery or component of the air conditioning system.

Referring to FIGS. 5 and 7, to mount the subassembly 100 to the TXV unit 200, tubular projections (126, 128) are inserted, respectively, in the mounting holes (204, 206) respectively, the gaskets/pilots (190, 192) nesting in the annular depressions (210, 212) respectively, and the shaft 208 passes through the interior bore 158 of the fastener 108. A stopper, such as a nut, can then be placed on the shaft 208 from the front end 218 of the shaft 208 to prevent axial movement of the subassembly 100 along the shaft 208.

Figure 8:
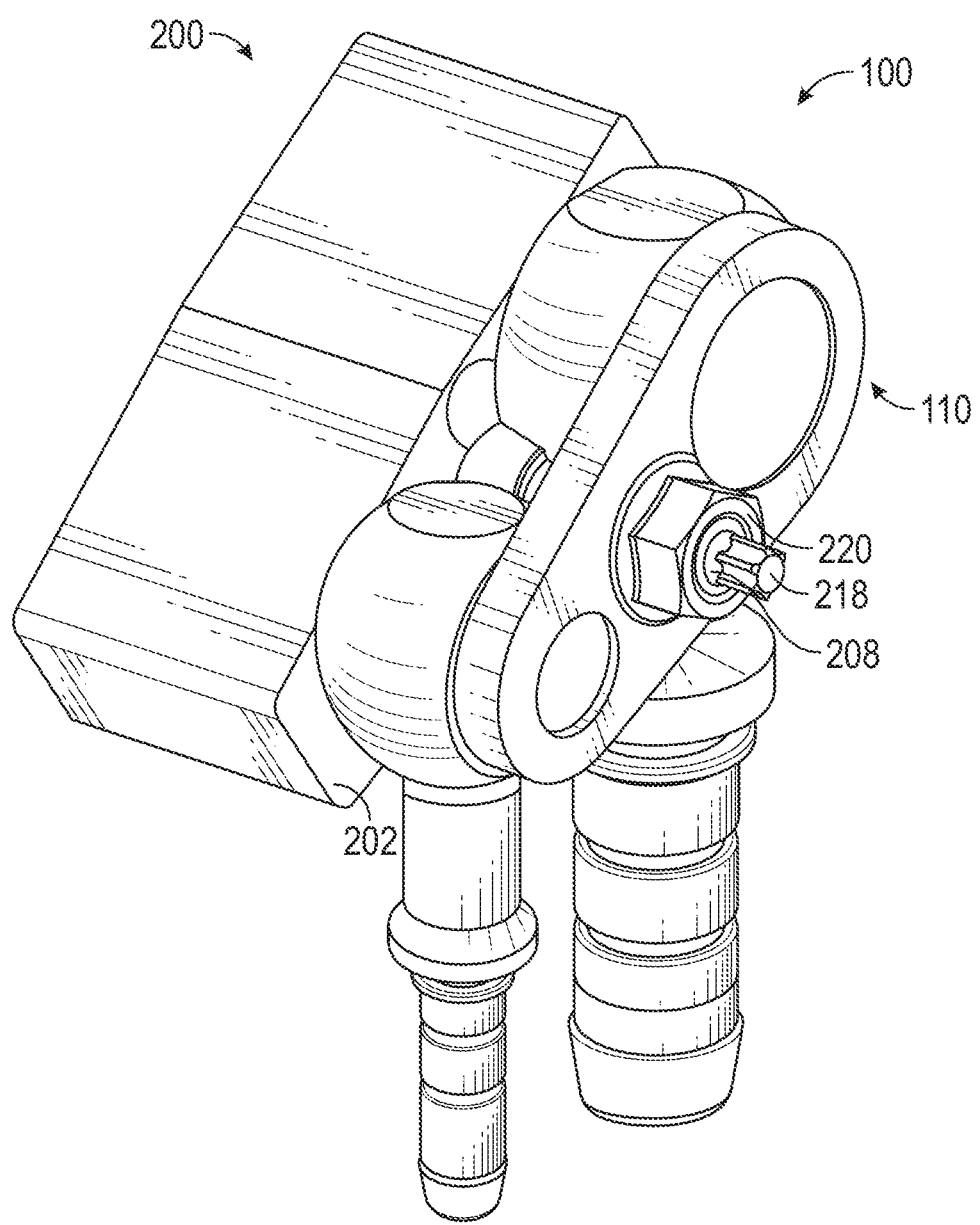
FIG. 8 shows a front isometric view of the air conditioner subassembly of FIGS. 5-6 mounted to the TXV unit of FIG. 7.

FIG. 8 shows a front isometric view of the subassembly 100 of FIGS. 5-6 mounted to the TXV unit 200 of FIG. 7 with a nut 220 (e.g. a threaded nut that screws on corresponding threads on the shaft 208) secured towards the front end 218 of the shaft 208 to prevent axial movement of the subassembly 100 along the shaft 208. To service or replace the TXV unit 200 and/or the subassembly 100, the nut 220 is removed, the subassembly 100 is slid forwardly off the shaft 208 and then the subassembly 100 can be dismantled as described above.

By aligning the cutouts of the fittings with the fastener and the shaft from the TXV unit, lateral space (e.g., the length of the bracket 106 from the first end 138 to the opposite second end 140 (FIG. 2)) is used efficiently, allowing for the implementation of a smaller TXV unit and subassembly 100 for use in air conditioning systems where space is limited.

Figure 9:
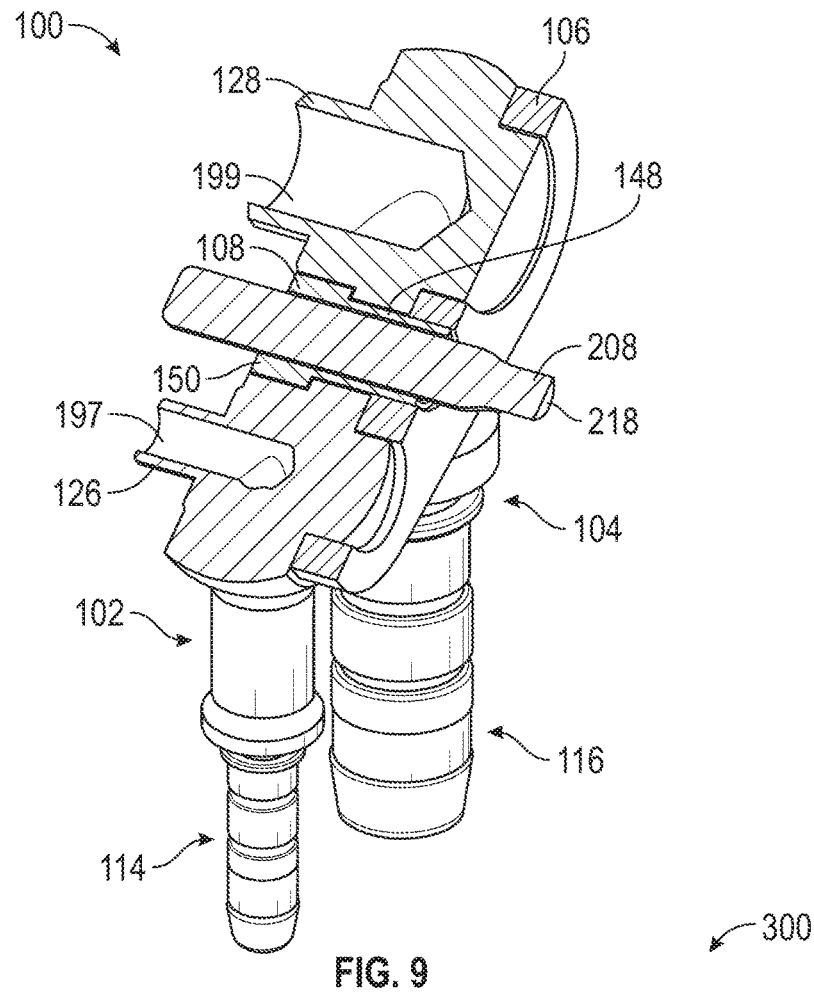
FIG. 9 is a cross-sectional view of a modified subassembly of FIG. 6 that shows both the air conditioner subassembly of FIG. 6 and also the TXV shaft of FIG. 8.

FIG. 9 is a modified cross-sectional view of FIG. 6 that shows both the subassembly 100 of FIG. 6 and also the shaft 208 of FIG. 8 passing through the interior bore of the fastener 108. Other than the shaft 208, the TXV unit 200 of FIG. 8 is not shown in FIG. 9. FIG. 9 also illustrates the fluid communication between the tubular projections (126, 128) that extend into the TXV unit and the hose mounting portions (114, 116) via the conduits (197, 199).

Figure 10:
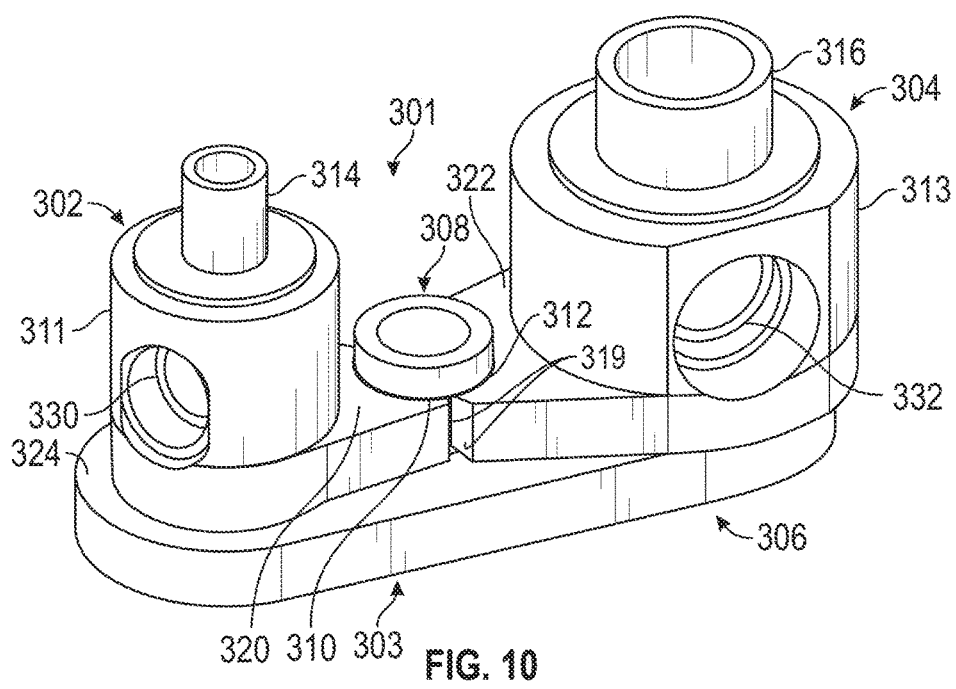
FIG. 10 is a back isometric view of a further embodiment of an air conditioner subassembly in accordance with the present disclosure.

FIG. 10 is a back isometric view of a further embodiment 300 of an air conditioner subassembly in accordance with the present disclosure. The subassembly 300 has a front 303 and a back 301 and includes a high pressure hose fitting 302, a low pressure hose fitting 304, a bracket 306 and a fastener 308. The fastener 308 is coaxial with cutouts (310, 312) in the fittings (302, 304), respectively, as well as a hole in the bracket 306, in the manner described above. Forward extending pilots on the fittings (302, 304) engage openings in the bracket 306, in the manner described above to constrain translational movement of the fittings prior to installation of the fastener 308. Once installed, the fastener 308 constrains the fittings (302, 304) both rotationally and axially in the manner described above. Tubular projections (314, 316) extend rearwardly from the bodies (311, 313) of the fittings (302, 304) for engaging openings in a TXV unit, in the manner described above.

As compared with the fittings (102, 104) described in connection with the subassembly 100, the fittings (302, 304) differ in that the cutouts (310, 312) are formed in flanges (320, 322) extending from the bodies (311, 313) towards the fastener 308, rather than in the bodies (111, 113) of the fittings (102, 104) themselves. In this example, the flanges (320, 322) include beveled or rounded end sides 319. In the example shown in FIG. 10, the flanges (320, 322) extend from the bodies (311, 313) to their beveled end sides 319, parallel to the back face 324 of the bracket 306.

In addition, rather than the hollow hose mounting portions (114, 116) of the subassembly 100, in the subassembly 300 hoses are connected to the fittings (302, 304) via hose openings (330, 332), the hose openings (330, 332) being configured to receive metal tubing affixed to the hose ends. The hose openings (330, 332) are in fluid communication with the tubular projections (314, 316). It should be appreciated that the placement of the hose openings (330, 332) on the fittings (302, 304) can be varied according to specific routing parameters of high and low pressure hoses in a given air conditioning system.

Figure 11:
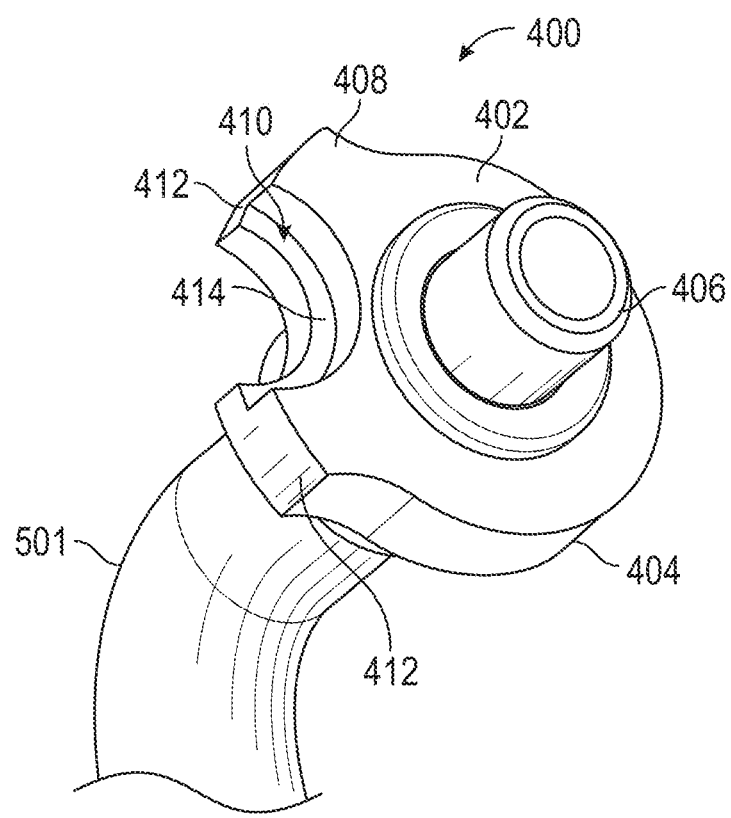
FIG. 11 is a back isometric view of a further embodiment of a hose fitting that can be used with an air conditioner subassembly in accordance with the present disclosure.

FIG. 11 is a back isometric view of a further embodiment of a hose fitting 400 that can be used with an air conditioner subassembly in accordance with the present disclosure. The hose fitting can be for either a high pressure or low pressure hose and paired with another hose fitting in the manner described above. The hose fitting 400 includes a back face 402, a body 404, a tubular projection 406 extending rearwardly from the body 404 for insertion in a TXV unit, a flange 408 extending from the body 440, and a cutout 410 in the flange. The flange 408 extends from the body 404 to beveled or rounded end sides 412. The cutout 410 includes a shoulder for engaging a head of a fastener in the manner described above. In this example, a hose 500 is shown pre-installed to the fitting 400.

Figure 12:
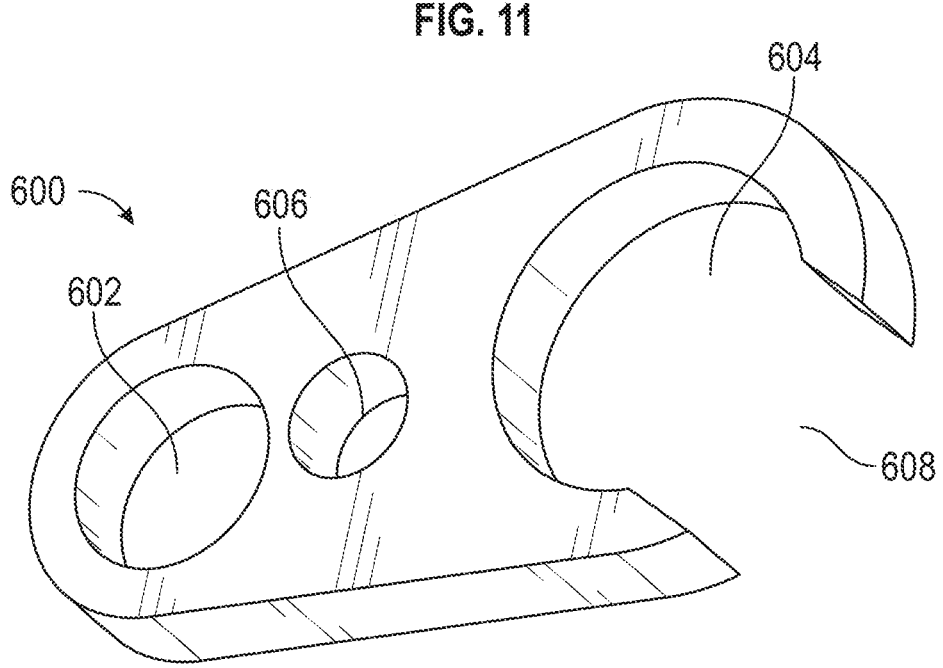
FIG. 12 is an isometric view of a further embodiment of a bracket that can be used in conjunction with the pre-assembled hose and fitting of FIG. 11.

FIG. 12 is an isometric view of a further embodiment of a bracket 600 that can be used in conjunction with the pre-assembled hose 500 and fitting 400 of FIG. 11. The bracket 600 includes a high pressure fitting opening 602 for receiving a portion of a high pressure hose fitting, a low pressure fitting opening 604 for receiving a portion of a low pressure hose fitting, and a fastener hole 606 for receiving the stem of a fastener, in the manner described above. However, in this example, the low pressure fitting opening 604 (which could alternatively be the high pressure fitting opening 602) includes a discontinuity in material forming a slot 608 through which a hose (e.g., the hose 501) that has been preassembled to a hose fitting (e.g., the hose fitting 401) can be inserted. Thus, the bracket 600 allows for preassembly of a hose and hose fitting prior to mounting that hose fitting to the bracket.

Figure 13:
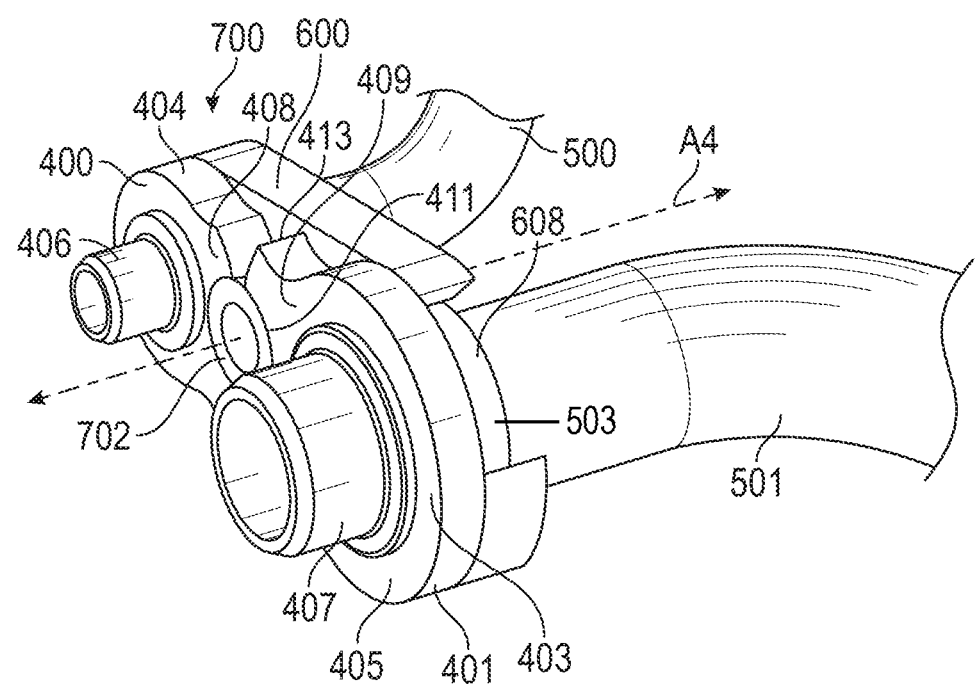
FIG. 13 is a back isometric view of a further embodiment of an air conditioner subassembly in accordance with the present disclosure.

FIG. 13 is a back isometric view of a further embodiment of an air conditioner subassembly 700 in accordance with the present disclosure. The subassembly 700 includes the hose fitting 400 of FIG. 11, which in this example constitutes a high pressure hose fitting. The subassembly 700 also includes a corresponding low pressure hose fitting 401. The low pressure hose fitting 401 has features that parallel in configuration and function to those of the high pressure hose fitting 400, including a back face 403, a body 405, a tubular projection 407, a flange 409 extending from the body 405, a cutout 411, and beveled ends sides 413 of the flange 409.

Still referring to FIG. 13, the high pressure fitting 400 can be pre-assembled (e.g., at the factory) with the bracket 600 and then hooked up to the hose 500 on location (e.g., once inside the vehicle), while the low pressure fitting 401 can be pre-assembled to the hose 501 and then assembled to the bracket 600 by sliding the hose 501 through the slot 608 in the bracket. At this point, the fastener 702 is pushed/screwed into the cutouts (410, 411) and the fastener hole 606 (FIG. 12) to complete the subassembly 700 with installed hoses (500, 501). Once the fastener 702 is installed, rotational movement, as well as axial movement of the fittings (400, 401) parallel to the axis $A_4$ that passes longitudinally through the interior bore of the fastener 702, is constrained, and the subassembly 700 can be mounted to a TXV unit in the manner described above. In addition, once the fastener 702 is installed, in some examples, the position of the slot 608 relative to the cutout 411 is such that the head of the fastener can constrain translational movement of the fitting 401 to prevent the fitting 401 from escaping the subassembly 700 via the slot 608. That is, the engagement of the fastener 702 and the cutouts (410, 411) can constrain movement of the fitting 401 towards the slot 608. Furthermore, translational movement of the fitting 401 is further constrained by the width of the slot 608 relative to the diameter of the pilot 503. Thus, in some examples, a combination of the angular position of the slot, the clearance fit between the pilot 503 and the opening 604, and the slot width relative to the pilot diameter, can translationally constrain the fitting 401.

Disassembly (e.g., for repair or replacement) can be performed by detaching the subassembly 700 from the TXV unit and removing the fastener 702. Then, if, e.g., servicing is required only for the fitting 401 and/or the hose 501, those parts can be slid through the slot 608, leaving the coupling of the fitting 400, the bracket 600, and the hose 500 intact.

Figure 14:
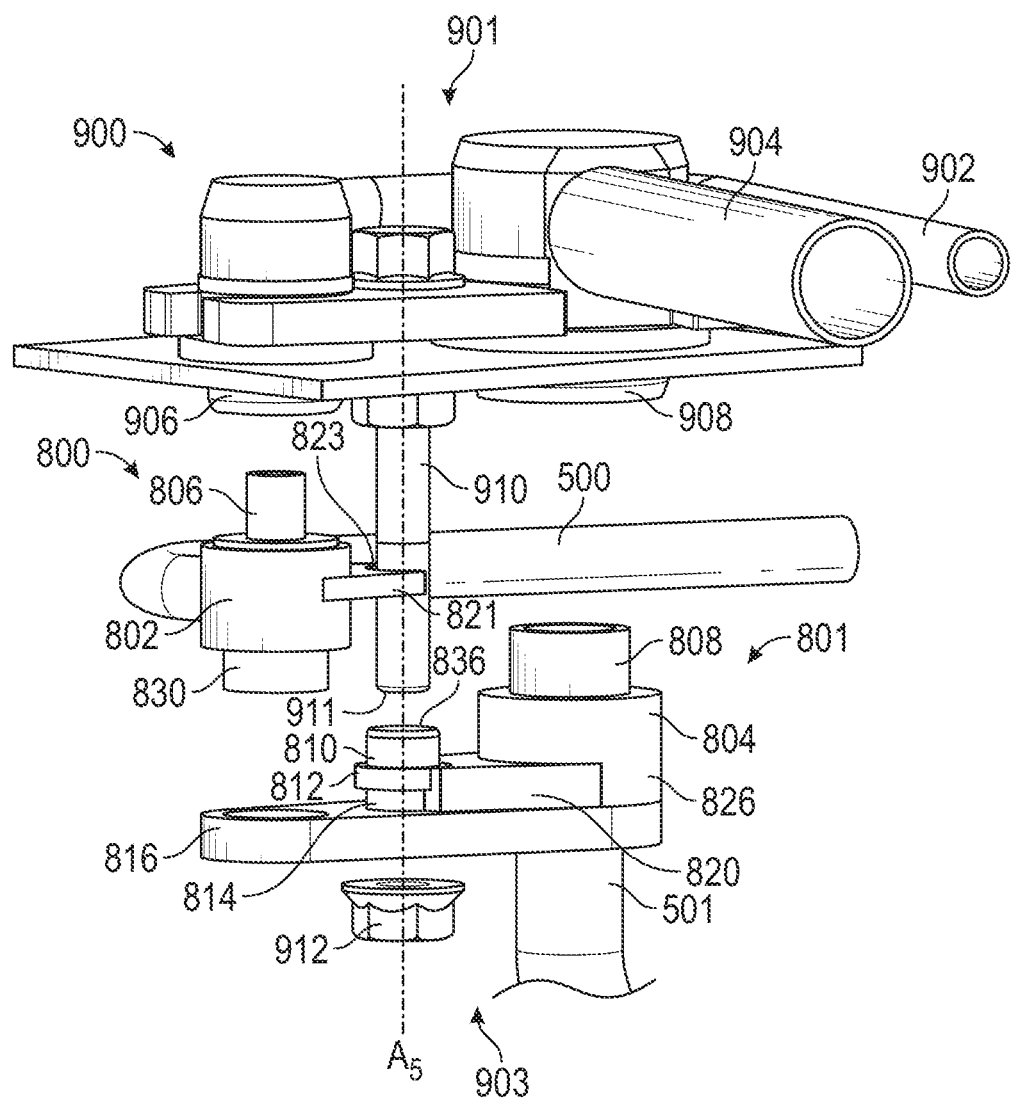
FIG. 14 is an isometric exploded view of an alternative embodiment of an air conditioner subassembly in accordance with the present disclosure and a manifold that can be used with the subassembly.
Figure 15:
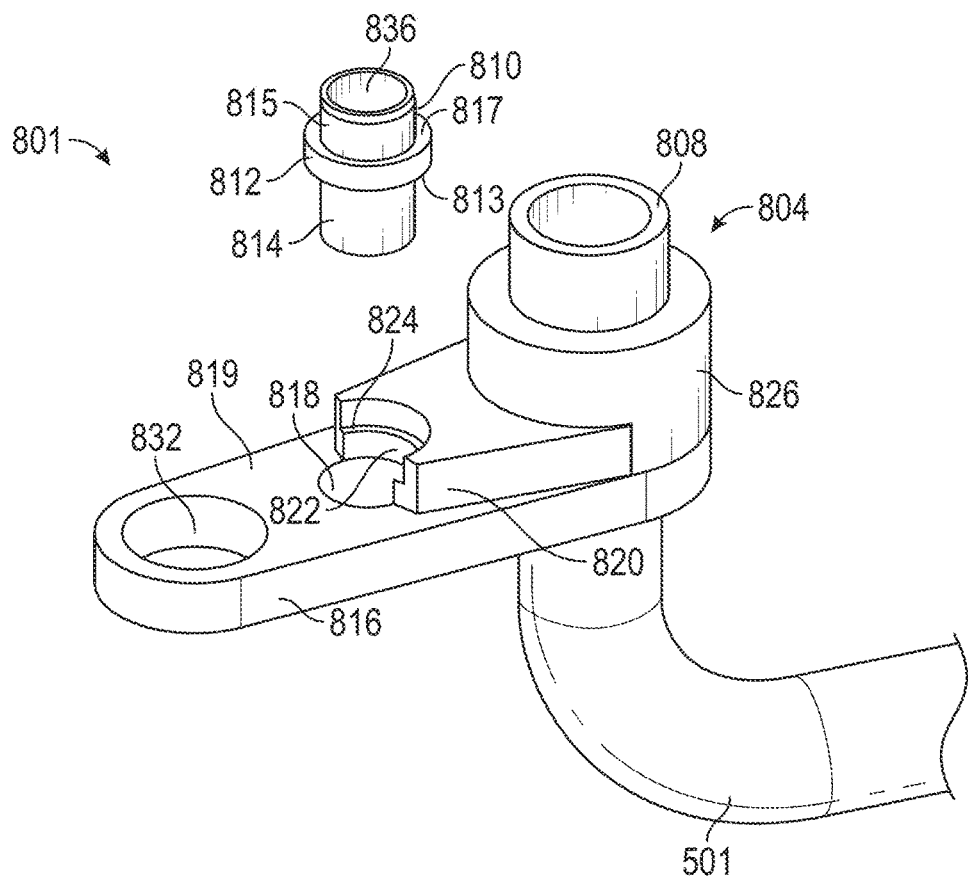
FIG. 15 is an isometric view of a portion of the subassembly of FIG. 14.
Figure 16:
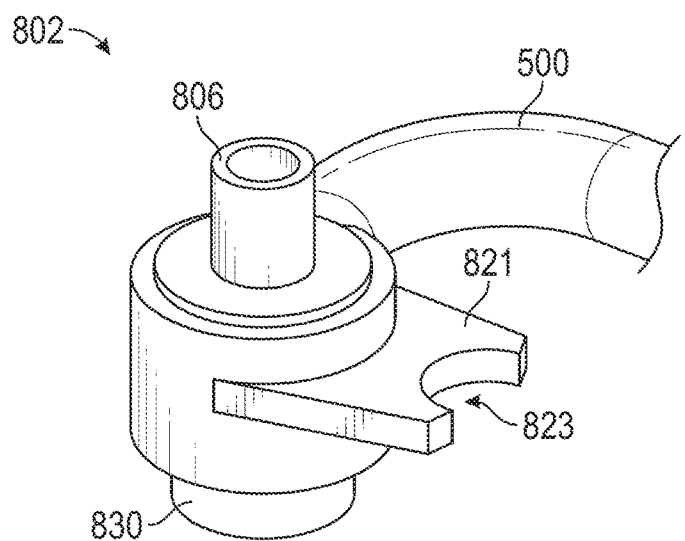
FIG. 16 is an isometric view of a further portion of the subassembly of FIG. 14.
Figure 17:
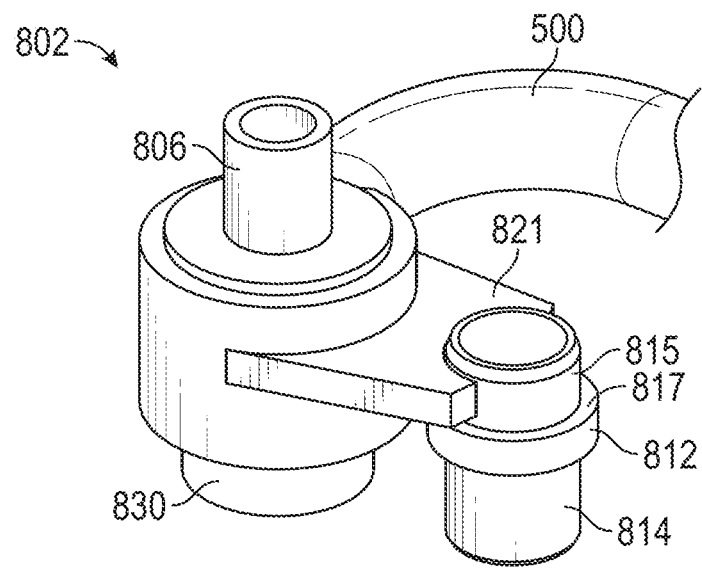
FIG. 17 is an isometric view of a further portion of the subassembly of FIG. 14.

FIG. 14 is an isometric exploded view of an alternative embodiment of an air conditioner subassembly 800 in accordance with the present disclosure and a manifold 900. FIG. 15 is an isometric view of a portion of the subassembly 800 of FIG. 14 constituting a partial subassembly 801. FIG. 16 is an isometric view of a further portion of the subassembly 800 of FIG. 14. FIG. 17 is an isometric view of a further portion of the subassembly 800 of FIG. 14. The subassembly 801 consists of a low pressure hose 500, a low pressure fitting 804, a bracket 816 and a fastener 810. The complete assembly of the subassembly 800 and the manifold 900 generally has a front 903 and a back 901.

Referring to FIGS. 14-17, in this alternative use embodiment of an air conditioner subassembly, the subassembly 800 is connected directly to the manifold 900 rather than to a TXV unit. In vehicular applications, such as an agricultural vehicle, the manifold 900 can be configured to route refrigerant between the interior of the cab and the engine via the high pressure conduit 902 and the low pressure conduit 904. The subassembly 800 is mounted to the manifold 900, such that the high pressure conduit 902 is in fluid communication with the high pressure hose 500, and such that the low pressure conduit 904 is in fluid communication with the low pressure hose 501.

Mounting portions 906 and 908 on the manifold 900 removably mount the fittings 802 and 804, respectively, of the subassembly 800. When mounted, the tubular extensions (806, 808) of the fittings (802, 804) enter the mounting portions (906, 908).

An example method of assembling the components of the subassembly 800 to the manifold 900 will now be described.

A pilot of the fitting 804 is inserted in an opening in the bracket 816 to create a clearance fit therebetween, and the hose 501 is connected to the fitting 804. Subsequently, the fastener 810 is coupled to the cutout 822 in the flange 820 extending from the body 826 of the fitting 804. In this example, the fastener has a head 812, a first stem portion 814 extending forwardly from the head 812, and a second stem portion 815 extending rearwardly from the head 812. The fastener 810 is coupled to the cutout 822 such that the front face 813 of the head 812 of the fastener 810 abuts the rearward facing annular shoulder 824 of the cutout 822, and such that the first stem portion 814 of the fastener is inserted in the hole 818 in the bracket 816, thus completing the partial subassembly 801.

The fitting 802 with connected high pressure hose 500 is left free until the partial subassembly 801 is ready to be assembled to the manifold 900. At that time the fitting 802 is positioned such that the shaft 910, which extends forwardly from the manifold 900, passes through the cutout 823 of the fitting 802. The partial subassembly 801, the fitting 802, and the manifold 900 are then brought together such that: 1) the pilot 830 of the fitting 802 is disposed in the opening 832 of the bracket 816 by way of a clearance fit; 2) the shaft 910 passes, from back to front, through the cutout 823, through an interior bore 836 in the fastener 810 and forwardly beyond the bracket 816 such that the end 911 of the shaft 910 can receive the nut 912 to secure the various components together; 3) the second stem portion 815 of the fastener 810 is received in the cutout 823 of the high pressure fitting 802; and 4) the back face 817 of the head 812 of the fastener 810 abuts the flange 821 of the high pressure fitting 802 to prevent forward translational movement of the high pressure fitting 802. Once assembled as described, centers of radii of curvature of the cutouts 822 and 823 are coaxially aligned with the longitudinal axis of the fastener 810, and the fastener 810 constrains rotational and lateral movement of the fittings (802, 804).

Thus, in the subassembly 800, when assembled to the manifold 900, the positioning of the flange 820 (and corresponding cutout 822) of the fitting 804 relative to the rear surface 819 of the bracket 816 differs from the relative positioning of the flange 821 (and the corresponding cutout 823) to the rear surface 819 of the bracket 816. More specifically, relative to the axis $A_5$ passing longitudinally through the center of the interior bore 836 and the center of the shaft 910, the cutout 822 is axially closer to the rear surface 819 than is the cutout 823. Thus, in some examples, the flange 820 of one of the fittings abuts the bracket 816, while the flange 821 of the other fitting is spaced from (i.e., does not abut) the bracket 816. In addition, in the example shown, the cutout 822 includes a shoulder 824, while the cutout 823 does not include a shoulder. It should be appreciated however, that the cutout 823 could be modified to include a shoulder.

The partial subassembly 801 can be advantageous in permitting routing and installation of one of the hoses (in this case, the high pressure hose 500 with corresponding fitting 802) in the air conditioning system at the end of the entire assembly process.

Disassembly of the subassembly 800 from the manifold 900 can be performed by removing the nut 912, sliding the partial subassembly 801 off the shaft 910 and displacing the fitting 802 and the hose 500 away from the shaft 910.

Figure 18:
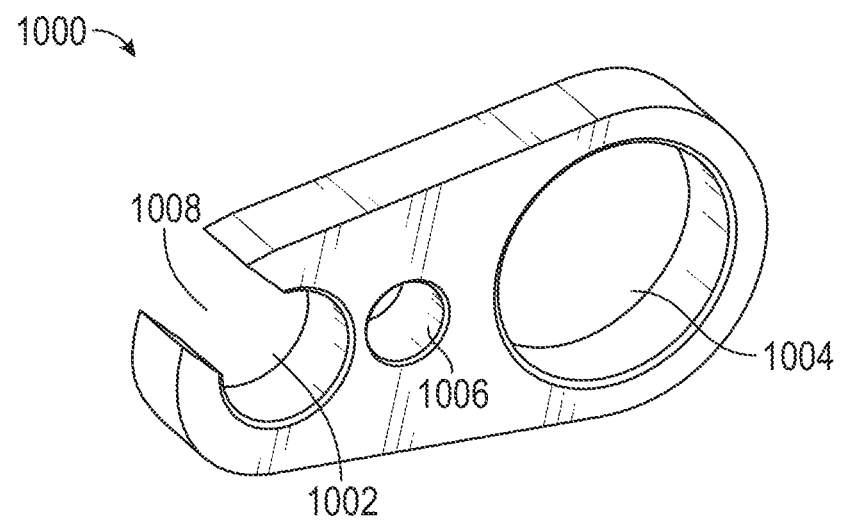
FIG. 18 is an isometric view of a further embodiment of a bracket that can be used in conjunction with air conditioner subassemblies of the present disclosure and including the pre-assembled hose and fitting of FIG. 11.
Figure 19:
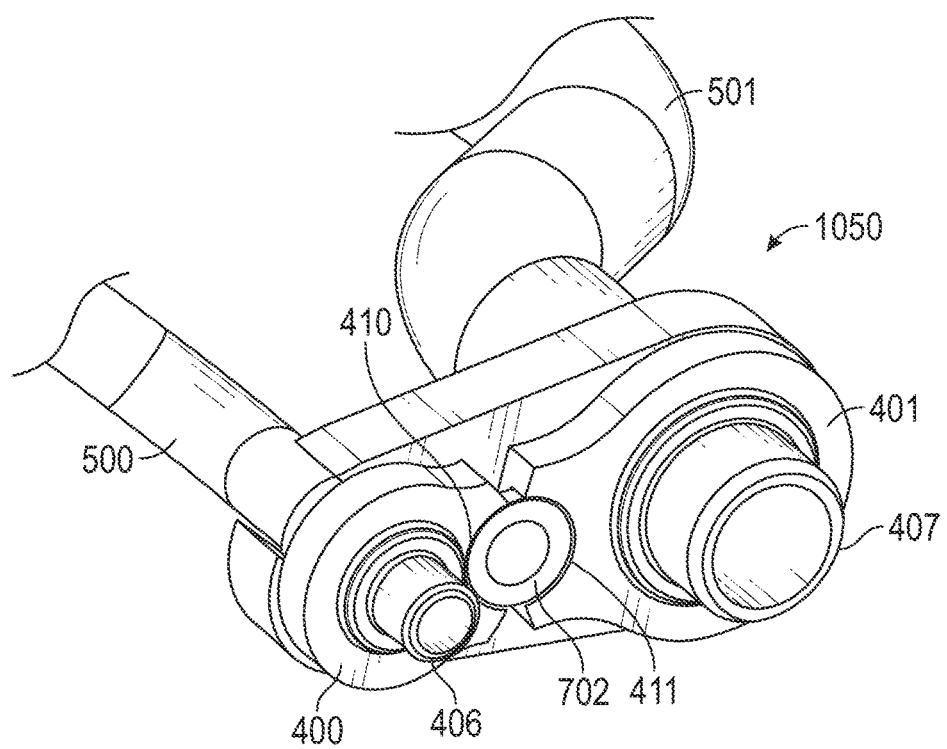
FIG. 19 is a back isometric view of a further embodiment of an air conditioner subassembly in accordance with the present disclosure, including the bracket of FIG. 18.
Figure 20:
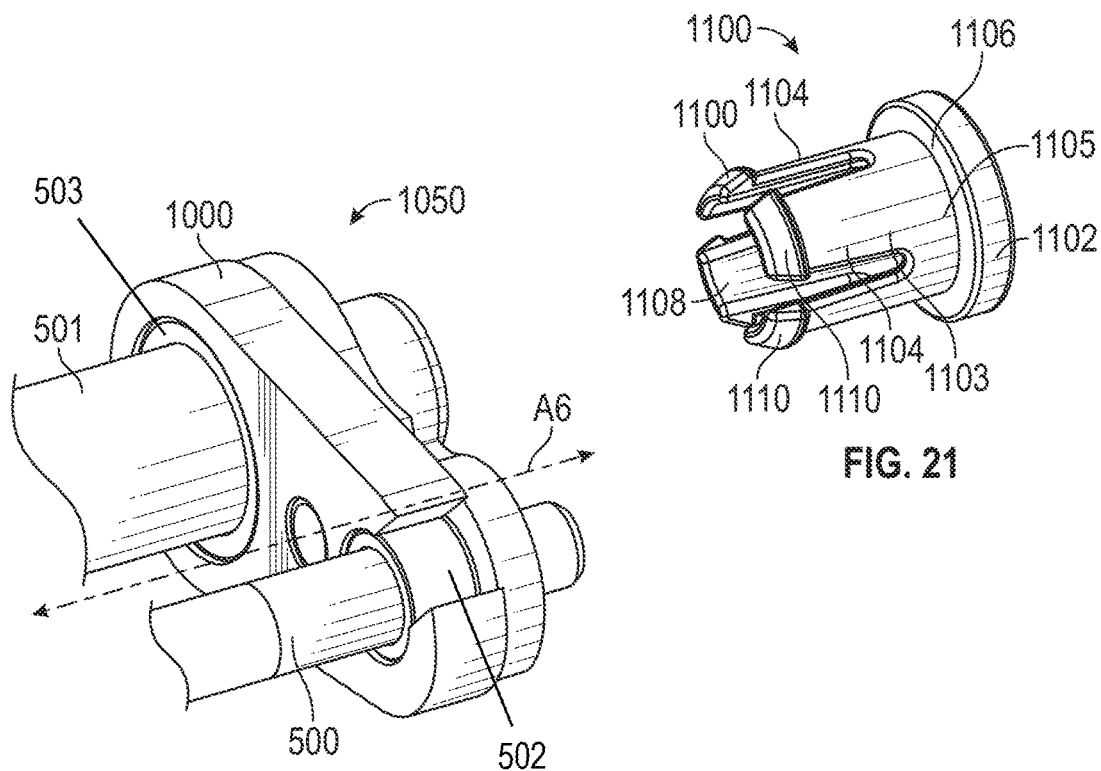
FIG. 20 is a front isometric view of the air conditioner subassembly of FIG. 19, showing pilots surrounding each of the hoses.

Referring now to FIGS. 18-20 a further embodiment of a bracket 1000 includes a high pressure fitting opening 1002 for receiving a portion of a high pressure hose fitting, a low pressure fitting opening 1004 for receiving a portion of a low pressure hose fitting, and a fastener hole 1006 for receiving the stem of a fastener, such as, but not limited to, the fasteners 108, 308, or 702 described above, or the fastener 1100 described below.

The high pressure fitting opening 1002 includes a discontinuity in material forming a slot 1008 through which a hose (e.g., the hose 500) that has been preassembled to a hose fitting (e.g., the hose fitting 400) can be inserted. Thus, the bracket 1000 allows for preassembly of a hose and hose fitting prior to mounting that hose fitting to the bracket. Providing the slot on the high pressure fitting opening rather than the low pressure fitting opening can further facilitate assembly.

The subassembly 1050 (FIGS. 19-20) includes, as a non-limiting example, the hose fitting 400 of FIG. 11, which in this example constitutes a high pressure hose fitting. The subassembly 1050 also includes, as a non-limiting example, a corresponding low pressure hose fitting 401 described above.

The low pressure fitting 401 can be pre-assembled (e.g., at the factory) with the bracket 1000 and then hooked up to the hose 501 on location (e.g., once inside the vehicle), while the high pressure fitting 400 can be pre-assembled to the hose 500 and then assembled to the bracket 1000 by sliding the hose 500 through the slot 1008 in the bracket. At this point, the fastener 702 is pushed/screwed into the cutouts (410, 411) and the fastener hole 1006 to complete the subassembly 1050 with installed hoses (500, 501). Once the fastener 702 is installed, rotational movement, as well as axial movement of the fittings (400, 401) parallel to the axis $A_6$ that passes longitudinally through the interior bore of the fastener 702, is constrained, and the subassembly 1050 can be mounted to a TXV unit.

In addition, once the fastener 702 is installed, the position of the slot 1008 relative to the cutout 410 is such that the head of the fastener can constrain translational movement of the fitting 400 to prevent the fitting 400 from escaping the subassembly 1050 via the slot 1008. That is, the engagement of the fastener 702 and the cutouts (410, 411) can constrain movement of the fitting 400 towards the slot 1008. Furthermore, translational movement of the fitting 400 is further constrained by the width of the slot 1008 relative to the diameter of the pilot 502. Thus, in some examples, a combination of the angular position of the slot 1008, the clearance fit between the pilot 502 and the opening 1002, and the slot width relative to the pilot diameter, can translationally constrain the fitting 400.

Figure 21:
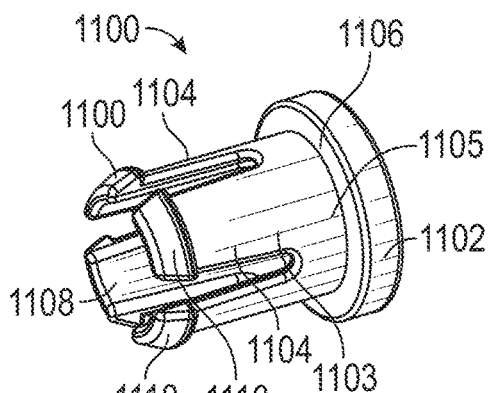
FIG. 21 is an isometric view of a further embodiment of a fastener that can be used in conjunction with air conditioner subassemblies of the present disclosure.

Referring now to FIG. 21, an alternative embodiment of a fastener 1100 is shown. The fastener 1100 can be used in conjunction with one or more of the subassemblies disclosed herein, including, e.g., the subassembly 100, the subassembly 300, the subassembly 700, or the subassembly 1050. The fastener 1100 is adapted to couple hose fittings (e.g., the hose fittings 400 and 401, the hose fittings 102 and 104, or the hose fitting 302 and 304) to a bracket, e.g., the bracket (106, 306, 600, 1000).

The fastener 1100 is a pushable pin having a head 1102, a stem 1103 defining a plurality (e.g., 2, 3, 4 or more) of resilient stem arms 1104 extending substantially axially from the stem base 1105 and the head 1102. The head 1102 can be, but need not be, received by the cutouts of the hose fittings and includes a forward facing annular flange 1106 that can abut the shoulder of the cutouts.

The fastener 1100 defines an axial bore 1108 extending through the fastener's open front end and open back end, The axial bore 1108 can be configured to receive a bolt or other fastener as described above.

Each of the resilient stem arms 1104 includes a projection 1110 projecting substantially away from the longitudinal axis of the fastener 110 and adapted to snappingly engage another portion of a subassembly (100, 300, 700, 1050), such as the bracket of the subassembly or the shoulders of the cutouts of the hose fittings of the subassembly, depending on whether the fastener 1100 is inserted from the rear or the front of the subassembly.

The various components of the air conditioner subassemblies can be manufactured in any suitable manner out of any suitable materials. In some examples, the hose fittings, bracket, and fastener are machined from a metal, such as aluminum or steel.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An air conditioner or refrigerator subassembly comprising:
   a first hose fitting;
   a second hose fitting;
   a bracket; and
   a fastener, each of the first and second hose fittings comprising a cutout having a border, at least two points on the border defining a radius of curvature, the first and second hose fittings being couplable to the bracket such that the first and second cutouts define a recess for receiving the fastener, the recess having a central axis aligned with a longitudinal dimension of the fastener, the central axis being coaxial with a center of the radius of curvature of each of the cutouts.

2. The subassembly of claim 1, wherein the fastener comprises a longitudinally extending interior bore configured to receive a shaft of a thermal expansion valve (TXV) unit.

3. The subassembly of claim 1, wherein each of the cutouts includes a shoulder, and the fastener includes a head and a stem, the head being configured to abut the shoulder of each of the cutouts.

4. The subassembly of claim 3 wherein the shoulder defines a first portion of the cutout that receives the stem of the fastener and a second portion of the cutout that receives the head of the fastener.

5. The subassembly of claim 1, wherein the bracket comprises a first end and a second end opposite the first end, the bracket having a width that tapers between the first end and the second end.

6. The subassembly of claim 1, wherein each of the first and second hose fittings comprises a pilot, and wherein the bracket comprises first and second openings for receiving the pilots.

7. The subassembly of claim 6, wherein the bracket comprises a hole for receiving the fastener, the hole being disposed between the first and second openings.

8. The subassembly of claim 7, wherein the first and second openings are closed loops.

9. The subassembly of 7, wherein only one of the first and second openings comprises a discontinuity forming a slot providing access to the opening.

10. The subassembly of claim 1, wherein each of the first and second hose fittings comprises a body, a tubular projection extending from the body for insertion in a thermal expansion valve (TXV) unit, and a hollow hose mounting portion extending from the body, wherein the cutout is formed in the body, and wherein the cutout is concave relative to an outer surface of the body.

11. The subassembly of claim 1, wherein each of the first and second hose fittings comprises a body, a tubular projection extending from the body for insertion in a thermal expansion valve (TXV) unit, and a flange extending from the body, and wherein the cutout is formed in the flange.

12. The subassembly of claim 1, wherein the first hose fitting is configured to mount a hose defining a first pressure, and wherein the second hose fitting is configured to mount a hose defining a second pressure that is lower than the first pressure, the first hose fitting being smaller than the second hose fitting.

13. The subassembly of claim 1, wherein the fastener constrains at least one of translational movement and rotational movement of the first hose fitting and the second hose fitting.

14. The subassembly of claim 1, wherein the fastener constrains both translational movement and rotational movement of the first hose fitting and the second hose fitting.

15. The subassembly of claim 1, wherein the fastener is a pushable pin.

16. The subassembly of claim 1, wherein the fastener is a screwable bolt.

17. The subassembly of claim 1, wherein the fastener comprises a stem defining a plurality of resilient stem arms, and wherein each of the resilient stem arms includes a projection projecting substantially away from a longitudinal axis of the fastener.

* * * * *